INDUCTANCE CAPACITY TUNER AND CIRCUIT THEREFOR

Filed Aug. 27, 1945 2 Sheets-Sheet 1

Inventor
Robert M. Beusman
by The Firm of Charles W. Hills Attys.

Sept. 12, 1950 R. M. BEUSMAN 2,521,963

INDUCTANCE CAPACITY TUNER AND CIRCUIT THEREFOR

Filed Aug. 27, 1945 2 Sheets-Sheet 2

Inventor
Robert M. Beusman
by The Firm of Charles W. Hills Attys.

Patented Sept. 12, 1950 2,521,963

UNITED STATES PATENT OFFICE 2,521,963

INDUCTANCE CAPACITY TUNER AND CIRCUIT THEREFOR

Robert M. Beusman, Oak Park, Ill.

Application August 27, 1945, Serial No. 612,927

2 Claims. (Cl. 250—40)

This invention relates to an inductance capacity tuner and circuit therefor, and more particularly to a means for varying the inductance of a coil having current of very high frequency flowing therethrough.

Considerable difficulty has been experienced in the past in obtaining tuning of a circuit at very high frequency with apparatus which is relatively low in cost. Ordinarily the factor of merit or in other words, the Q, for a fixed coil and a variable condenser in a circuit carrying current having a frequency of the order of magnitude of 50 megacycles or higher, effectively is about 60 to 110. The factor of merit for permeability tuning is much higher, such, for example, as 200 to 240 over a range of 50 to 70 megacycles, roughly. There are certain disadvantages to permeability tuning, however, which are well-known to those skilled in the art.

One of the principal features and objects of the present invention is to provide a novel method and means for varying the inductance of a coil by varying the magnetic shielding and shorting effect on the coil.

A further object of the present invention is to provide a novel method and means for changing the inductance of a coil carrying ultra high frequency current which includes using one or more of the rotor condenser plates of a variable condenser to vary the shielding of the coil, and thereby vary the inductance thereof.

Another and further object of the present invention is to provide a novel method and means for forming a tuned circuit in ultra high frequency apparatus, and for varying the tuning thereof.

Still a further object of the present invention is to provide a novel method and means for varying the inductance of a coil by providing a progressive short-circuiting effect on the coil.

Still another and further object of the present invention is to provide a novel ultra high frequency radio circuit.

Still another and further object of this invention is to provide a variable resonant circuit free from multi-ground returns, such as found in variable air capacity tuning. Such variable capacitors normally have numerous ground points which tend to produce high frequency eddy currents in the condenser frame and chassis, resulting in losses.

The novel features which I believe to be characteristic of my invention are set forth with particularity in the appended claims. My invention itself, however, both as to its method of operation and manner of construction, together with further objects and advantages thereof, may best be understood by reference to the accompanying drawings, in which:

Figure 1:
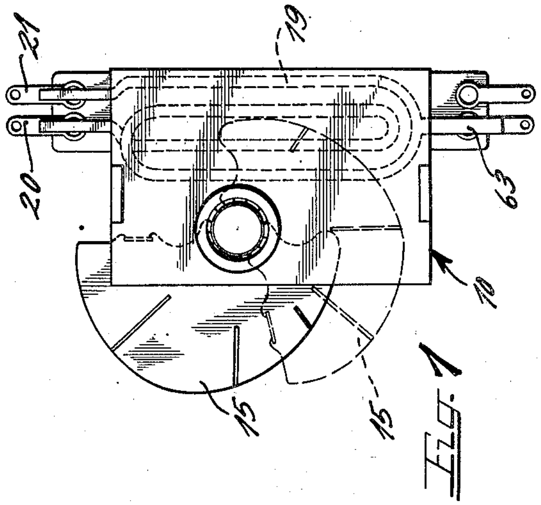
Figure 1 is a diagrammatic end view of a gang condenser and inductance tuning element embodying the novel features and characteristics of the present invention.
Figure 2:
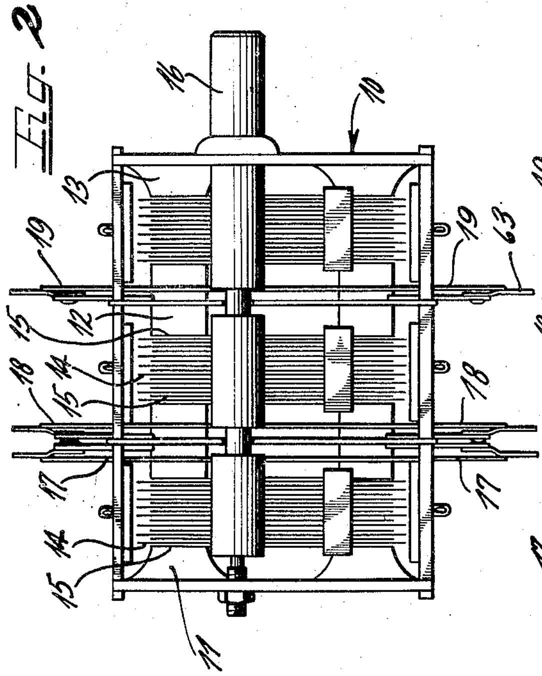
Figure 2 is a diagrammatic front elevational view of the unit shown in Figure 1 of the drawing.

Referring first to Figures 1 and 2 of the drawing, there is illustrated therein a gang condenser 10 having three sections, 11, 12 and 13. This gang condenser 10 is of conventional design and each of its sections 11, 12 and 13 is provided with a plurality of stator plates 14 and a plurality of rotor plates 15 interposed between the stator plates. The rotor plates 15 are mounted in conventional manner on the rotor shaft 16 and are arranged to be moved from a position in which they are disposed substantially entirely between the stator plates progressively to a position where they are substantially entirely free of the stator plates 14. This provides a variable capacity effect in a conventional manner.

As is well known to those skilled in the art, the rotor plates may be given any suitable shape but preferably are shaped in such a manner so as to provide proper "tracking" of the oscillator.

Three pancake inductance elements, 17, 18 and 19, are mounted opposite the end rotor plates 15 of each gang condenser section 11, 12 and 13. The inductance unit 19, as seen in Figure 1, is similar to the other inductance elements 17 and 18 and may be said to be generally spiral in shape. It has been found in practice that the particular shape given to the inductance element will vary in accordance with the particular shape of the rotor plate element 15, in order to provide desirable "tracking" characteristics or to provide uniform changes in inductance with equal increment of change in the angular position of the rotor element 15.

The inductance element 19 has two terminal portions 20 and 21 which are arranged to be connected to other portions of the electrical circuit in which the tuning element is used.

Assume now that current is flowing through the inductance element 19 at a frequency of 30 megacycles or higher. This might, for example, be current in the frequency range of 88 to 108 megacycles, which is one of the higher frequency ranges in which this tuning element may be used to great advantage. As the rotor plates 15 are rotated in a counterclockwise direction, as viewed in Figure 1 of the drawing, the rotor plate 15 immediately adjacent the inductance element 19 gradually moves into a position directly opposite the flat face of the coil. Thus as the rotor element 15 progressively moves opposite the coil 19, it introduces a shorting effect on the coil which progressively increases. This causes the inductance of the coil to be reduced. It is also apparent that this reduction in the inductance of the coil is due to a shielding effect which the plate 15 has on the coil.

It is to be observed that here we are decreasing the inductance as each plate is moved into the field of the coil, while in permeability tuning the inductance is increased as the powdered iron core member is moved into the coil. In view of the fact that the inductance is decreased as you move the plate into the field of the coil, it is possible to use a larger inductance coil than is possible with permeability tuning. It will furthermore be noted that the shielding comes into effect at a time when shielding becomes more and more desirable.

It will, of course, be apparent that the plate which is progressively moved into the field of the inductance coil does not have to be the rotor plate, for any non-magnetic alloy or non-magnetic metal may be used, such, for example, as aluminum or copper. By combining the inductance element with a gang condenser, however, the rotor of the gang condenser acts in a dual capacity; namely, it acts as a variable shield for tuning the inductance element or elements at ultra high frequencies, and it also acts in its conventional manner as a condenser for tuning circuits at relatively low frequencies. An example of how the capacity inductance tuner may be used in a radio circuit is shown in Figure 3 of the drawing.

Figures 3, 6:
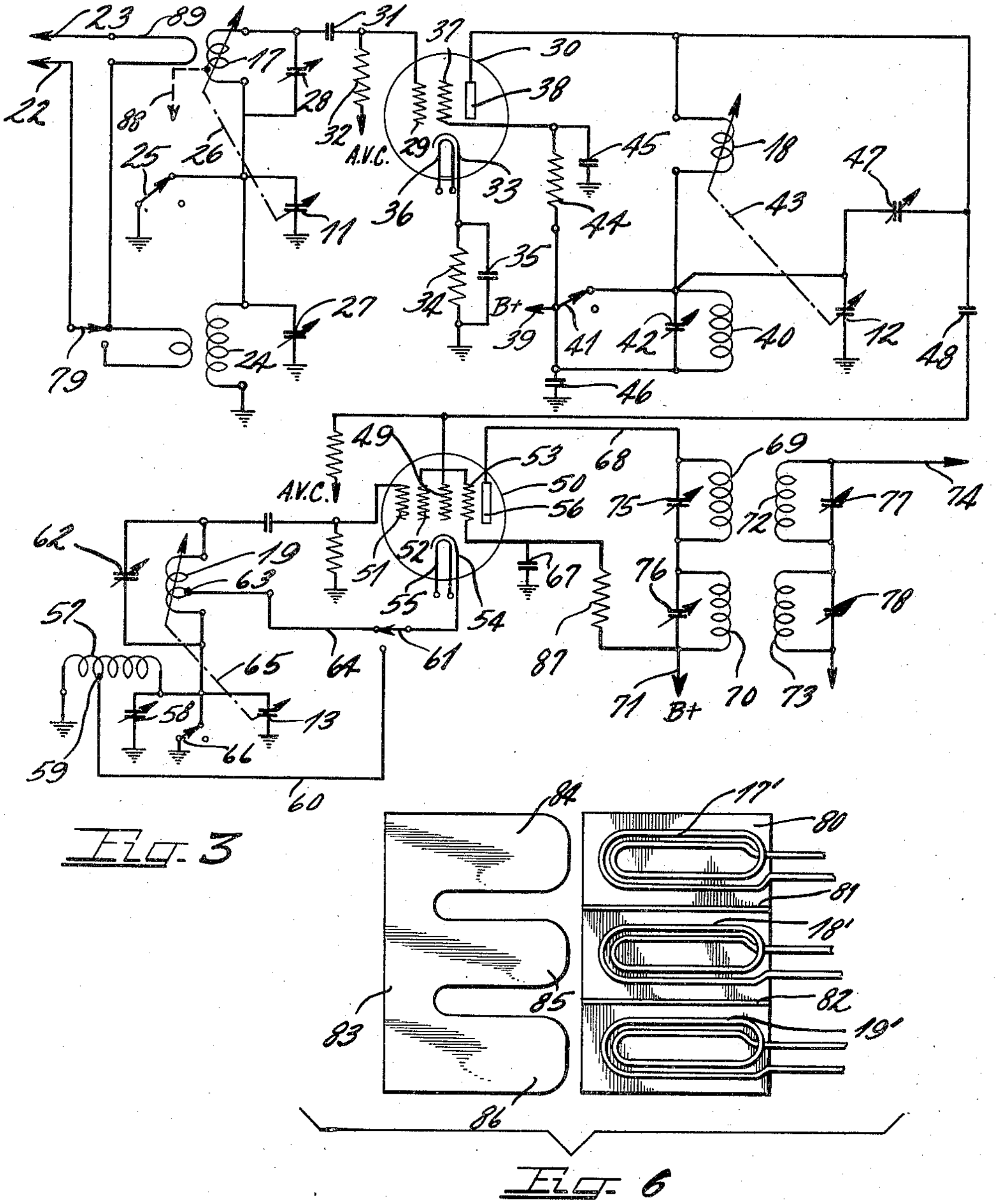
Figure 3 is a diagrammatic illustration of a radio circuit including the novel inductance capacity tuner shown in Figures 1 and 2.
Figure 6 is a diagrammatic view of a third embodiment of the present invention in which a shielding element reciprocates into and out of shielding position with a plurality of inductance elements.

The radio circuit diagrammatically illustrated in Figure 3 includes transmission line conductors 22 and 23 which connect an antenna (not shown) to either the ultra high frequency band antenna coil 17 or to the broadcast or low frequency band antenna coil 24, depending upon the location of the band switch 25. When the band switch 25 is in its upper position as shown in Figure 3 of the drawing the broadcast antenna coil 24 is shorted out to ground. When the switch 25 is in its lower position the broadcast antenna coil is in operating connection in the circuit. While the ultra high frequency coil 17 has not been cut out of the circuit, it has substantially no effect since its inductance at broadcast or low frequency band frequencies is negligible.

The broadcast antenna coil 24 is arranged to be tuned by the variable condenser 11 which is one section of the gang condenser 10 shown in Figures 1 and 2 of the drawing. As previously pointed out, the inductance 17 is tuned at ultra high frequencies by the adjacent end rotor plate of the variable condenser 11. Since it is the movement of the rotor or movable element of the gang condenser which effects the tuning of the inductance element 17, at ultra high frequencies, these elements have been shown as mechanically related by means of the broken line 26.

The usual trimmer condensers 27 and 28 are also provided for the coils 24 and 17 respectively.

These two tuned circuits are connected to the input grid 29 of an R. F. amplifier tube or discharge device 30 by means of capacity coupling 31. The resistance element 32 shown in the circuit of the input grid 29 is part of the A. V. C. circuit as indicated. The electron discharge device or vacuum tube 30 may be of any conventional design and includes, in addition to the input grid 29, an indirectly heated cathode 33 which is self-biased by a resistor 34. Filter condenser 35 shunts the biasing resistor 34 in the conventional manner. The indirectly heated cathode 33 is associated with a heater 36. The tube 30 also had a screen grid 37 and an anode 38. The anode 38 is supplied with a positive bias from a source of uni-directional electric energy indicated as B+ by the arrow 39. More particularly, the B+ is connected through the low frequency band coil 40 and on the ultra high frequency band radio frequency coil 18. A band switch 41, mechanically associated with the switch 25, is arranged to short out the coil 40 in its upper position, thereby providing ultra high frequency band reception. To render coil 40 effective for operation in the low frequency band, the switch 41 is placed in its lower position.

A trimmer condenser 42 is connected in shunt with the coil 40. The coil 40 is further arranged to be selectively tuned by section 12 of the gang condenser 10 shown in Figures 1 and 2 of the drawing. Since it is the rotor plate of the section 12 which effects tuning of the ultra high frequency coil 18, the variable condenser 12 and the coil 18 have been indicated as being mechanically associated by means of shaft 16, as shown by the broken line 43.

The screen grid 37 of the tube 30 receives its bias through a dropping resistor 44. This resistor 44 is provided with a radio frequency by-pass condenser 45 as shown. Another radio frequency by-pass condenser 46 is also connected to the movable element of the switch 41. A trimmer condenser 47 is provided in shunt with the coil 18.

The output of the tube 30 as fed through the tuned circuit is connected through a coupling condenser 48 to the input grid 49 of the multi-grid mixer tube 50. In addition to the input grid 49 the tube 50 includes three additional grids 51, 52 and 53 as well as a cathode 54, a heater 55 and an anode 56.

The oscillator circuit includes a low frequency band oscillating coil 57 which has connected thereacross the variable condenser 13, which is section 13 of the gang condenser 10 shown in Figures 1 and 2. It is also provided with a trimmer condenser 58. The coil 57 is tapped as at 59 and connected back through a conductor 60 and the band switch 61 to the cathode 54 of the tube 50. The coil 19, which is the coil shown in detail in Figures 1 and 2 of the drawing, has a trimmer condenser 62 connected thereacross. This coil is also tapped as at 63 (see Figures 1 and 3) and is connected from this tap 63 through a conductor 64 and the switch 61 to the cathode 54.

As previously discussed in connection with the sections 11 and 12 of the gang condenser 10, the section 13 is also mechanically associated with the tuning of the coil 19 and is therefore shown as being mechanically associated by means of shaft 16 by the broken line 65. The switch 66, which is also part of the band switch, is arranged when in its upper position to short out the coil 57. Switch 66 when in its lower position connects the coil 57 in its operating position in the circuit. It will further be noted that the switch 61 selectively connects the tapped portion 63 of the coil 19 or the tapped portion 59 of the coil 57, depending upon whether the circuit is being used for the reception of ultra high frequency waves or for the reception of waves in the low frequency band.

The grid elements 52 and 53 are connected together and through a condenser 67 to ground. They are also supplied with positive bias through a dropping resistor 87 from B+ energy source.

The anode 56 is connected through the conductor 68 to the ultra high frequency band intermediate frequency coil 69 and then to the broadcast band intermediate frequency coil 70, the lower end of coil 70 being connected through a conductor 71 to the source of unidirectional electric energy that supplies voltage for the anode 56 of tube 50. Coils 69 and 70 are inductively coupled to coils 72 and 73, the latter being arranged to be fed through the conductor 74 to the subsequent detector and audio frequency amplification stages. The coils 69, 70, 72 and 73 are provided in shunt circuit with condensers 75, 76, 77 and 78, respectively. Resonant circuits 69, 75 and 72, 77 are inductively coupled and are tuned, for example, to approximately 10.7 megacycles for the purpose of receiving signals in the ultra high frequency band. Resonant circuits 70, 76 and 73, 78 are inductively coupled and are tuned, by way of example, to approximately 755 kilocycles for the purpose of receiving signals in the low frequency band.

The 10.7 megacycle intermediate frequencies or the 455 kilocycle intermediate frequencies are amplified, detected, and the audio frequency amplified and reproduced into audible frequencies in accordance with general practice known to the art.

The audio frequency end of the radio circuit is not illustrated herein for the particular construction of the audio frequency end in no way affects the present invention.

The circuit which has been described above is arranged to receive radio energy transmitted in the so-called "broadcast band" as well as ultra high frequency energy, such, for example, as energy in the 88 to 108 megacycle band.

A tap connection 88 on coil 17 in Figure 3 may be used as an antenna coupling tap to 23 in place of the link or primary coil 89.

Figure 4:
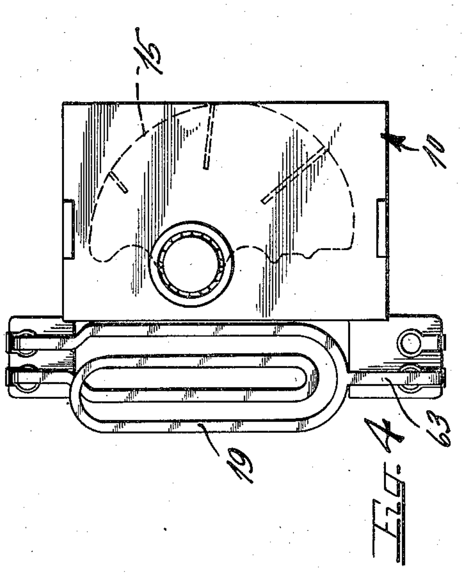
Figure 4 is a diagrammatic end view similar to Figure 1 but showing a modified form of the present invention.
Figure 5:
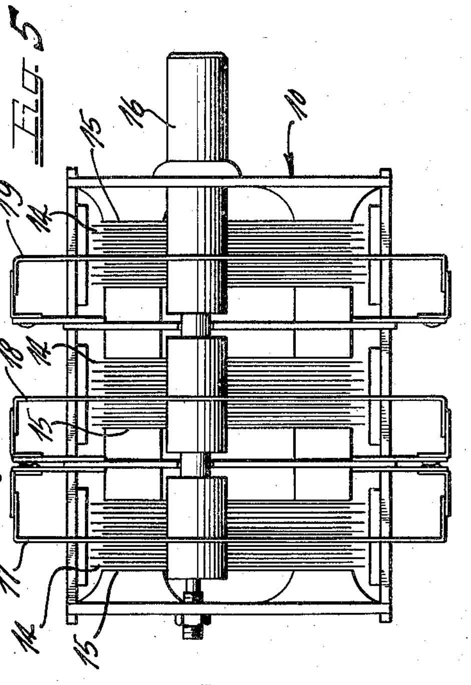
Figure 5 is a diagrammatic front elevational view of the embodiment of the invention shown in Figure 4 of the drawing.

A second embodiment of the present invention is illustrated in Figures 4 and 5 of the drawings. This particular form of the invention is similar to that shown in Figures 1 and 2 with the exception that the ultra high frequency tuning coils 17 and 18 and 19 are mounted externally of the frame of the gang condenser 10 so that the coils are progressively shorted by adjacent rotor plates 15 when the rotor plates are moved out of the stator plates instead of between the plates which, as described above, occurs in the embodiment of Figures 1 and 2. It will be noted that this is the reverse of that shown in Figures 1 and 2, where the progressive decrease in the inductance of the coils 17, 18 and 19, is effected as the rotor plates 15 are moved into the stator plates.

A second difference in this embodiment of the invention lies in the fact that the coils 17, 18 and 19 are positioned so that adjacent rotor plates will pass on both sides of each coil 17, 18 and 19. For that reason the coils 17, 18 and 19 are not positioned beyond the end of the last rotor plate, but are positioned at an intermediate place along the rotor plate assembly. The short circuiting effect on the coils 17, 18 and 19 is greater when so positioned, as is also the shielding effect. The coils are employed otherwise in the same manner as that described in connection with Figures 1, 2 and 3 of the drawings.

Figure 7:
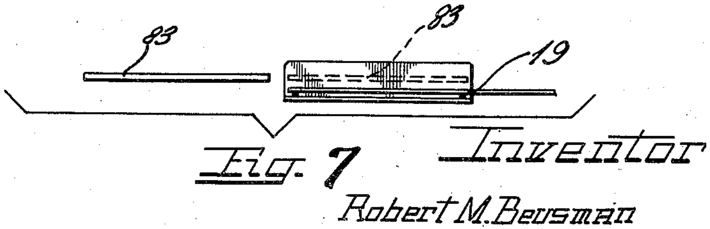
Figure 7 is a diagrammatic bottom view of the embodiment of the invention shown in Figure 6 of the drawing.

A third embodiment of the present invention is illustrated in Figures 6 and 7 of the drawings. More particularly, three ultra high frequency tuning coils 17', 18' and 19', are mounted on a base 80. Electrostatic shields 81 and 82 are disposed between adjacent coils, thereby to shield each coil from the other two. A plate 83 formed of conducting material, such, for example, as copper or aluminum, is mounted for reciprocal movement into a position over the base 80 and out to the position shown in Figures 6 and 7 of the drawings. This plate 83 is provided with three finger portions 84, 85 and 86 which are arranged to progressively extend over the coils 17', 18' and 19' respectively as the member 83 is moved to the right. This plate 83 provides a short circuiting effect on the coils 17', 18' and 19' similar to the effect of shorting the secondary of a transformer. This, of course, brings about a reduction in the inductance of the coils 17', 18' and 19'. It also provides a shielding effect which progressively reduces the inductance value of the coils as the member 83 is moved into a position thereover. From the above description, it will be apparent that the third embodiment of the present invention is similar to the first two embodiments of the invention with the principal exception that the short circuiting means is arranged for reciprocating movement rather than rotary movement.

While I have shown certain particular embodiments of my invention, it will, of course, be understood that I do not wish to be limited thereto, since many modifications may be made and I, therefore, contemplate by the appended claims to cover all such modifications as fall within the true spirit and scope of my invention.

I claim as my invention:

1. In a radio frequency tuning device, the combination of spaced parallel shield plates, a transverse shaft supported thereby, a stator condenser plate, a pancake inductance coil, said stator plate and said coil supported in spaced relationship parallel to and between said shield plates, a rotor condenser plate secured to said shaft for rotation therewith from a position remote from to a position between and parallel to said stator plate and said coil, whereby the inductance of said coil is varied from a maximum to a minimum and the capacitance of said condenser plates is simultaneously varied from a minimum to a maximum.

2. In a radio frequency tuning device, the combination of spaced parallel shield plates, a transverse shaft supported thereby, a plurality of stator condenser plates and a pancake inductance coil mounted in spaced parallel relationship with and between said shield plates, a plurality of rotor condenser plates secured to said shaft for rotation therewith, said rotor plates being spaced to interleave with said stator plates and said coil, in series connection a capacitance and inductance, said coil and said condenser plates respectively connected in parallel across said capacitance and said inductance to form a high and a low frequency tunable circuit, switch means to short one of said circuits, whereby rotation of said shaft may selectively tune the high frequency circuit inductively and the low frequency circuit capacitively.

ROBERT M. BEUSMAN.

REFERENCES CITED

The following references are of record in the file of this patent:

UNITED STATES PATENTS

| Number | Name | Date |
|---|---|---|
| 1,571,405 | Goldsmith | Feb. 2, 1926 |
| 1,766,002 | Price | June 24, 1930 |
| 2,147,425 | Bock | Feb. 14, 1939 |
| 2,341,345 | Van Billiard | Feb. 8, 1944 |
| 2,367,681 | Karplus et al. | Jan. 23, 1945 |
| 2,384,504 | Thias | Sept. 11, 1945 |

FOREIGN PATENTS

| Number | Country | Date |
|---|---|---|
| 202,115 | Great Britain | Mar. 1923 |
| 309,894 | Germany | Dec. 21, 1918 |